United States Patent
Topazi (10) Patent No.: US 9,942,068 B1
(45) Date of Patent: Apr. 10, 2018

(54) ACTIVE DEVICE TO ENABLE THE USE OF LEGACY-EQUIPMENT IN HIGHER RETURN BAND SPLITS

(71) Applicant: Cox Communications, Inc., Atlanta, GA (US)

(72) Inventor: Christopher James Topazi, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 239 days.

(21) Appl. No.: 14/845,116

(22) Filed: Sep. 3, 2015

(51) Int. Cl.
*H04L 12/28* (2006.01)
*H04L 27/10* (2006.01)
*H04L 27/148* (2006.01)

(52) U.S. Cl.
CPC ............ *H04L 27/10* (2013.01); *H04L 27/148* (2013.01)

(58) Field of Classification Search
CPC .............................. H04L 27/10; H04L 27/148
See application file for complete search history.

(56) References Cited

U.S. PATENT DOCUMENTS

| 8,181,208 B1* | 5/2012 | Elwardani | H04N 7/104 725/144 |
| 2004/0177381 A1* | 9/2004 | Kliger | H04N 7/106 725/131 |
| 2006/0256799 A1* | 11/2006 | Eng | H04L 12/2801 370/401 |

OTHER PUBLICATIONS

MoCA 1.1 Specification for Device RF Characteristics, Multimedia over Coax Alliance, Feb. 11, 2014.
Ayham Al-Banna, Architecting the DOCSIS® Network to Offer Symmetric 1Gbps Service over the Next Two Decades, The NCTA 2012 Spring Technical Forum Proceedings, May 21, 2012.
Physical Layer Specification, Data Over Cable Service Interface Specifications DOCSIS® 3.0, CM-SP-PHYv3.0-I12-150305, Mar. 5, 2015.
SCTE, Digital Broadband Delivery System: Out of Band Transport Part 1: Mode A, Society of Cable Telecommunications Engineers, ANSI/SCTE 55-1, 2009.
SCTE, Digital Broadband Delivery System: Out of Band Transport Part 2: Mode B, Society of Cable Telecommunications Engineers, ANSI/SCTE 55-2, 2008.
Steve Condra, Cable Networks Evolution II, Cisco Knowledge Network, May 16, 2012.

* cited by examiner

Primary Examiner — Melvin Marcelo
(74) Attorney, Agent, or Firm — Merchant & Gould

(57) ABSTRACT

Devices and methods for enabling the use of legacy-equipment in light of evolving and conflicting standards used by new-equipment are provided. When a standard for transmission on a network conflicts with an existing standard, legacy-equipment, which uses the existing standard, may prevent the implementation of new-equipment, which uses a new or updated standard, on the network. Although many standards strive for backwards compatibility or interoperability with other standards, not all standards are compatible, or they achieve backwards compatibility by disabling features of new-equipment until legacy-equipment has been upgraded or removed from the network. Devices and methods therefore are provided to isolate legacy-equipment and new-equipment so that the new features of evolving standards may be implemented for new-equipment without materially impacting the operation of legacy-equipment.

20 Claims, 4 Drawing Sheets

ACTIVE DEVICE TO ENABLE THE USE OF LEGACY-EQUIPMENT IN HIGHER RETURN BAND SPLITS

BACKGROUND

Hardware devices installed to provide cable network services to consumers (e.g., modems, set top boxes, DVRs, etc.) conform to various industry standards, which are constantly evolving. As these standards evolve, new features may be added to the standards that currently deployed devices are incapable of providing or are incompatible with. For example, a new feature offered by a new standard may use a frequency band for signal transmission that interferes or conflicts with signals transmitted or received by legacy-equipment. To accommodate these legacy devices, new features may be disabled on new-equipment until the legacy-equipment sharing a network with the new-equipment is updated, upgraded, or replaced. The costs and logistical difficulties in updating, upgrading, or replacing the deployed devices may be considerable, and, as a result, many consumers are left with services that do not incorporate the new standard for long periods of time, even when some of their equipment is capable of using these new features. Additionally, because equipment conforming to the new standard may interfere with legacy-equipment, new features may be disabled so long as legacy-equipment is deployed, delaying a service provider's upgrades and updates to its facilities.

SUMMARY

Aspects of the present disclosure provide for methods and devices to enable the use of legacy-equipment in light of new, conflicting standards. Legacy-equipment includes devices that have been deployed conforming to an industry standard that is no longer the most recent version of that standard and devices that have been deployed according to a standard that now conflicts with the most recent version of another standard. As is understood, industry standards evolve to add new features, improve reliability, and leverage new technologies. Many industry standards strive for backwards compatibility, so that legacy-equipment is still operable with the latest standard, but not all standards are backwards compatible. Even when standards are backwards compatible, legacy-equipment may not be able to access the new features and many old features may be diminished or disabled. Alternatively, new-equipment may be limited in its functionality when it operates alongside legacy-equipment.

In one example, the Data-Over-Cable Service Interface Specifications (DOCSIS) standard version 3.1 allows cable modems a larger operating frequency band than previous versions of the DOCSIS standard, which may interfere with legacy-equipment already communicating within the frequency band that DOCSIS 3.1 has expanded into. Example legacy-equipment that may be affected by DOCSIS 3.1 includes, but is not limited to: set top boxes, smart TVs with integrated converter boxes, and adapters for networking computing devices via the Multimedia over Coax Alliance (MoCA) standard and thereby the devices connected via the MoCA adapters. The cable modems complying with the new DOCSIS 3.1 standard, which may interfere with the legacy-equipment, are an example of new-equipment.

For consumers to have access to the new features of a standard, and retain the operability of their legacy-equipment, devices and methods to enable the use of legacy-equipment are provided. Aspects are operable to split signals destined for legacy-equipment from those destined for new-equipment. According to aspects, the split signals may be individually amplified, blocked, modulated, and frequency shifted. Splitting signals allows legacy-equipment to operate within optimal parameters, while allowing the new-equipment to access all the new features of the updated standard without interfering or conflicting with the operation of legacy-equipment.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As briefly described above, aspects of the present disclosure provide for methods and devices to enable the use of legacy-equipment in light of new, conflicting standards. Legacy-equipment includes devices that have been deployed conforming to an industry standard that is no longer the most recent version of that standard and devices that have been deployed according to a standard that now conflicts with the most recent version of another standard. As is understood, industry standards evolve to add new features, improve reliability, and leverage new technologies. Many industry standards strive for backwards compatibility, so that legacy-equipment is still operable alongside devices using the latest standard, but not all standards are backwards compatible. Even when standards are backwards compatible, legacy-equipment may not be able to access the new features and may lose some old features to accommodate the new standard. Alternatively, new-equipment may be limited in its functionality when it operates alongside legacy-equipment to accommodate the old standard and legacy-equipment.

In one example, the Data-Over-Cable Service Interface Specifications (DOCSIS) standard version 3.1 allows cable modems a larger operating frequency band than previous DOCSIS versions, which may interfere with legacy-equipment already communicating within the frequency band that version 3.1 of the DOCSIS standard has expanded into. Example legacy-equipment that may be affected by DOCSIS 3.1 includes, but is not limited to, set top boxes (STBs), smart TVs with integrated converter boxes, and adapters for networking computing devices via the Multimedia over Coax Alliance (MoCA) standard. The cable modems complying with the new DOCSIS 3.1 standard, which may interfere with the legacy-equipment, are an example of new-equipment.

Methods and devices to enable the use of new and legacy-equipment on the same network without disabling functionalities of the new-equipment are provided herein. Aspects are operable to split signals destined for legacy-equipment from those destined for new-equipment to thereby isolate new-equipment and legacy-equipment. Signals complying with the new standard may be delivered to (and received from) new-equipment and signals complying with the old standard may be delivered to (and received from) legacy-equipment so that each set of equipment on the network does not interference with the other sets of equipment. According to aspects, signals complying with the new standard are sent by a service provider (e.g., a cable television provider, a satellite services provider, an internet service provider, etc.) and the split signal destined for legacy-equipment is appropriately amplified, blocked, modulated, or frequency shifted so that legacy-equipment receive a signal that complies with the standards under which it was designed. Similarly, aspects provide for signals received from the legacy-equipment to be appropriately amplified, blocked, modulated, or frequency shifted so that they may be combined with signals received from new-equipment and transmitted to the service provider without conflicting with signals complying with the new standard. Thus, each set of equipment, legacy and new, is enabled to operate within optimal parameters, while allowing the service provider to offer all the new features of the new standard to appropriate devices without interfering with the operation of legacy-equipment.

Figure 1:
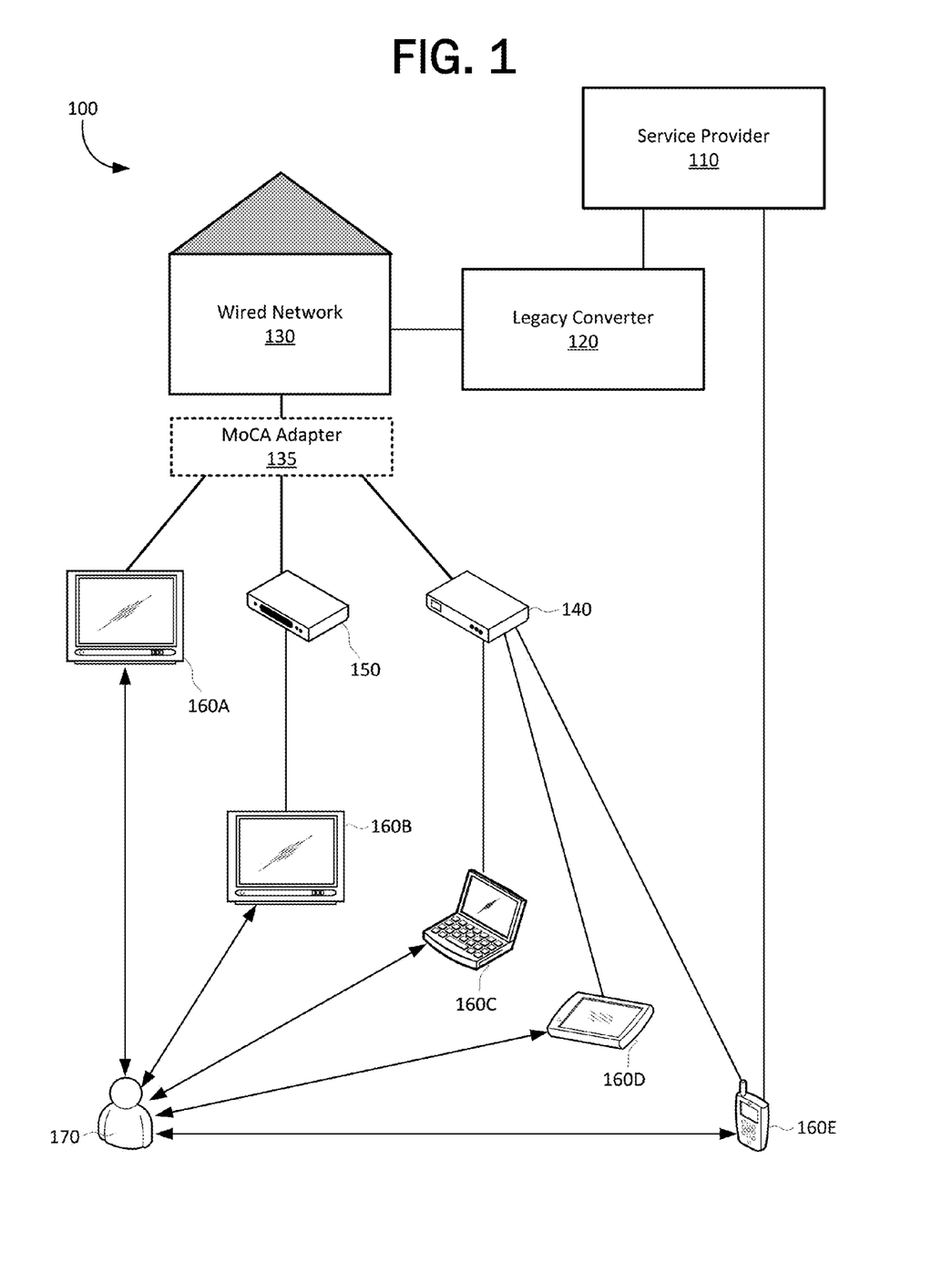
FIG. 1 is a block diagram of an operating environment in which a legacy converter is deployed.

FIG. 1 is a block diagram of an operating environment 100 in which a legacy converter 120 is deployed. As is illustrated, the legacy converter 120 is provided between a service provider 110 and a wired network 130. In various aspects, the legacy converter 120 may be inside or outside of a building at various points within the path between the service provider 110 and the wired network 130 and may be an active (i.e., powered) device. In one example, the legacy converter 120 is deployed between the entry point of a building having a wired network 130 and a head end of a Hybrid Fiber-Coax (HFC) network of the service provider 110. By deploying the legacy converter 120 as in the example, it may be installed and maintained without requiring entry into a subscriber's building, and several legacy converters 120 may be installed at one location (e.g., at a cable service box for an apartment complex) to provide individualized service for unique buildings or subsets thereof.

The wired network 130 includes the transmission media installed in the subscriber's building that are used to deliver content from the service provider 110 to a subscriber 170 and to transmit communications from the subscriber 170 to the service provider 110. In one example, these transmission media may include coaxial cables (also referred to as coax) that are typically used to wire a dwelling or other building for receiving cable television, telephone, and internet service. The subscriber's building may include all or a subset of a building (e.g., one apartment, one office, a floor, etc.) that includes a wired network 130.

Several devices may be connected to the wired network 130 to communicate with the service provider 110. These devices may be able to independently process signals or work in conjunction with other devices to process signals to display content from the service provider 110 or transmit signals to the service provider 110. Example devices include, but are not limited to: a MoCA adapter 135, a cable modem 140, a set-top box (STB) 150, and user devices 160. User devices 160 provide content to subscribers 170 in a human-consumable form (e.g., signals are converted into pictures, sounds, documents, etc.), and may include smart televisions 160A, televisions 160B, computers 160C, tablet devices 160D, cellular phones 160E, etc. Some devices, such as, for example, a cellular phone 160E, may communicate with the service provider 110 via alternative transmission media in addition to the wired network 130, for example, via a cellular network, satellite communications, etc.

When subscribers 170 connect devices to the wired network 130, those devices are operable to send signals to and receive signals from the service provider 110. The signals, however, are all transmitted within the wired network 130 over a single transmission medium; the wiring that comprises the wired network 130. To share the transmission medium, the devices may operate according to a set of standards to send and receive messages in distinct frequency bands (e.g., a first device may send/receive signals having frequencies from 100 MHz to 200 MHz whereas a second device may send/receive signals having frequencies from 300 MHz to 400 MHz). The frequency bands for a device may be further divided into channels so that multiple devices using the same standard may share the frequency band without conflicting/interfering with one another or to subdivide the frequency band for specific messages (e.g., a device may receive television stations from 54 to 88 MHz and use the frequencies from 1125 to 1225 MHz for cross device communications, etc.). For example, a device may send messages on an upstream channel within its frequency band and receive messages on a downstream channel within its frequency band. As one of skill in the art will recognize, a signal may carry a plurality of messages at different frequencies across a transmission medium that are modulated according to various analog and digital modulation schemes (e.g., amplitude modulation (AM), frequency modulation (FM), quadrature amplitude modulation (QAM), phase-shift keying (PSK), etc.).

In addition to communicating with the service provider 110, user devices 160 may communicate with one another over the wired network 130, such as, for example, via the MoCA standard. As will be understood by those skilled in the art, MoCA enables devices to communicate within the wired network 130 with other devices connected to the wired network 130. Devices, which may communicate over various transmission media (e.g., an STB 150 over coax, a computer 160C over Ethernet, etc.), may be enabled to use the wired network 130 via an optional MoCA adapter 135, which enables the use of coax as a transmission medium for a local network of user devices 160. As will be understood, each device may use a separate MoCA adapter 135 to connect to the wired network 130 or multiple devices may share the same MoCA adapter 135. MoCA adapters 135 may be integrated into devices connected to the wired network 130, standalone devices, or integrated into the wiring (e.g., coax wall outlets) of the building. Although the smart television 160A, STB 150, and cable modem 140 are illustrated in FIG. 1 as connected to the Wired network 130 via an optional MoCA Adapter 135, devices may be directly connected to the wired network 130 even when other devices are connected via a MoCA Adapter 135. For example, a first cable modem 140 may be connected directly to the wired network 130 and a second cable modem 140 may be simultaneously connected to the wired network 130 via a MoCA adapter 135.

By using the wired network 130, which may consist of coax installed when the building was constructed, subscribers 170 may inexpensively have access to a local network for all their devices without the expense of running Ethernet cable to create a network, or the heightened risk of interference and unauthorized access associated with wireless networks. The MoCA standard also allows for devices not normally networked over Ethernet or Wi-Fi to join the network. For example, a television 160B connected via an STB 150 may be used as a networked device along with a computer 160C connected via a cable modem 140 so that files on the computer 160C may be retrieved by the STB 150 for display on the television 160B.

As will be understood, the service provider 110 transmits signals to the devices connected to the wired network 130 and these signals are generated according to various standards (e.g., DOCSIS, National Television Systems Committee (NTSC), Advanced Television Systems Committee (ATSC), Digital Video Broadcasting (DVB), Integrated Services Digital Broadcasting (ISDB), Digital Terrestrial Multimedia Broadcast (DTMB), etc.) that the devices are capable of receiving. According to some aspects, some devices (e.g., cable modem 140) may send signals back to the service provider 110, which are similarly generated according to standards. When a standard is updated or replaced, these signals may overlap the frequency bands of signals generated according to another standard, which may cause interference or spurious results. For example, when DOCSIS was updated from version 2.0 to version 3.0, the upstream channel added frequencies from 42 MHz to 85 MHz, and any device using the 42 MHz to 85 MHz band would have to compete with DOCSIS signals (e.g., NTSC devices on low channels) and would view the DOCSIS signals as interference.

The legacy converter 120 enables a service provider 110 to transmit signals according to the latest standards to all subscribers 170 even when the latest standard conflicts with the legacy standards used by devices for an individual subscriber 170. The legacy converter 120 receives signals from the service provider 110 and converts them into formats readable by legacy devices on the wired network 130, and vice versa, so that interference generated by signals competing for frequency bands is reduced. In various aspects, one or more of the competing signals are eliminated as potential sources of interference for other signals by filtering out or shifting the frequencies of the one or more competing signals.

Figure 2:
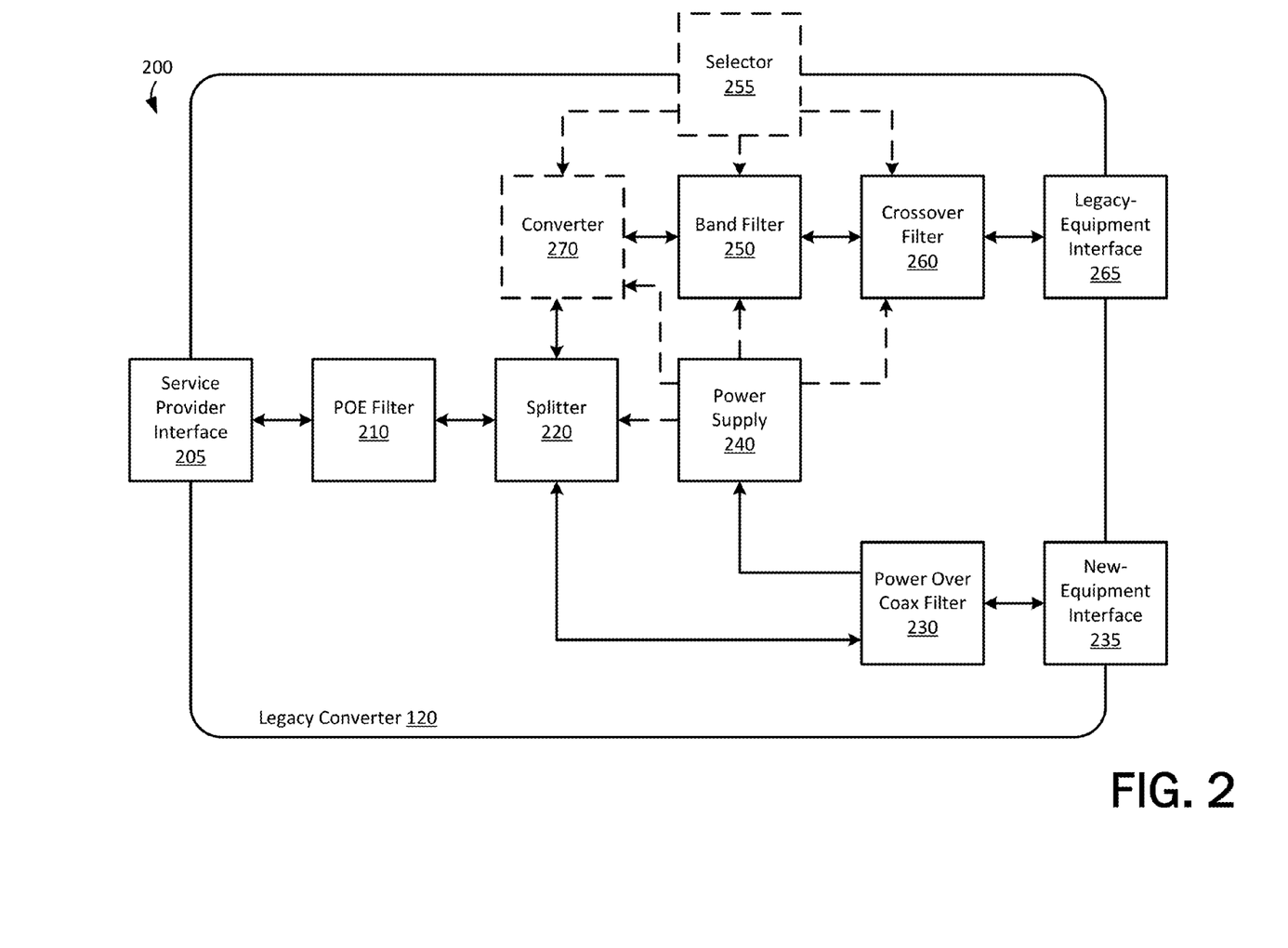
FIG. 2 is a block diagram of an example embodiment of the legacy converter.

FIG. 2 is a block diagram of an example embodiment 200 of the legacy converter 120. The legacy converter 120 is operable to separate the operating frequency bands for types of devices connected within a wired network 130 to reduce interference between those device types, which may not be adequately provided by the standards that the devices comply with.

The legacy converter 120 is provided between a service provider 110 and user devices 160, and may be provided either indoors or outdoors. Accordingly, the legacy converter 120 may include a weatherproof casing, tamper-resistant closures to prevent access to internal components (e.g., one-way screws, rivets, lock-and-key tabs, etc.), and areas operable to receive written notes from service personnel (e.g., date of installation, services provided at installed location, serial number, etc.).

As will be understood, signals may traverse the legacy converter 120 from the service provider 110 to the wired network 130 and from the wired network 130 to the service provider 110, as illustrated with double-ended arrows in FIG. 2. Signals traveling in one direction may be split at a component, whereas signals traveling in the other direction are combined at the same component. Therefore, examples will be given in one direction of transmission (e.g., from service provider 110 to wired network 130) and, unless noted otherwise, are to be taken as teaching the reverse action for signals traveling in the reverse direction.

As illustrated, the legacy converter 120 includes three interfaces, which are operable to accept and transmit signals. In various aspects, the interfaces may be assigned to specific input/output targets. A service provider interface 205 is provided as a common port for the legacy converter 120 to be in communication with a service provider 110. A legacy-equipment interface 265 is provided to be in communication with an STB 150, a smart television 160A with a network card, or a similar device using a legacy standard, and provide properly conditioned signals to those devices such that they perceive signals received that conform to the legacy standard. A new-equipment interface 235 is provided to be in communication with a cable modem 140 or other similar device conforming to the new standard, such that the advantages and frequency bands offered by the new standard may be fully provided to the connected devices. These interfaces may include various attachment points for cables, including threads, plugs/jacks, bayonet connectors, flanges, etc.

Depending on the number of entry points and wiring of the wired network 130, the legacy converter 120 may replace a two-way radio frequency (RF) splitter at the entry point for the building. As is common in home installations, the wired network 130 may be subdivided by a two-way RF splitter at the entry point of the building with a first terminal connected to a first subdivision of the wired network 130 and a second terminal connected to a second subdivision of the wired network 130. Legacy-equipment may thus operate on the first subdivision and new-equipment on the second subdivision when the legacy converter 120 replaces the entry filter. As should be noted, the legacy-equipment and the new-equipment may still communicate with one another across the splitter 220 of the legacy converter 120 even when they are placed on different subdivisions of the wired network 130.

Alternatively, when the wired network 130 has multiple entry points, or the wired network 130 lacks subdivisions, multiple legacy converters 120 may be deployed. For example, in a wired network 130 lacking subdivisions, a legacy converter 120 may be communicated between each wall outlet and user device 160 via the appropriate interface for the category of receiving device (i.e., legacy or new). As will be understood, when no equipment is connected to a given interface, the interface may be left bare or a terminator may be installed.

Signals received at the service provider interface 205 enter the legacy converter 120 and are passed through a Point of Entry (POE) filter 210. One example of a POE filter 210 is a low-pass filter having characteristics to block signals exceeding a given frequency. In one example, the POE filter 210 is a filter configured to prevent signals generated on the wired network 130 from leaving the wired network 130 and being transmitted to the service provider 110, while allowing signals received from the service provider 110 to enter the wired network 130. For example, MoCA signals, particularly those in the highest bands (e.g., between 1.4 and 1.7 GHz), may be blocked from exiting the building by the POE filter 210, while the full downstream spectrum for DOCSIS version 3.1 (e.g., up to 1.2 GHz) from the service provider 110 is allowed to enter the legacy converter 120 and reach the new-equipment. The POE filter 210 thereby enables local signals (e.g., MoCA signals) between devices on the wired network 130 to remain local; local signals are not transmitted to the service provider 110.

After passing through the POE filter 210, the signals from the service provider 110 are split at splitter 220 to be processed separately for legacy and new-equipment on the wired network 130. In one aspect, the splitter 220 is specified to operate up to 1.7 GHz so that it will properly reflect the MoCA D-high band, should a MoCA connection be needed between the legacy-equipment interface 265 and the new-equipment interface 235. According to aspects, the splitter 220 may be a two-way splitter having three terminals: a common terminal in communication with the service provider 110, a terminal in communication with legacy-equipment, and a terminal in communication with new-equipment. As will be understood, a signal received at the common terminal may be split and transmitted via the terminals in communication with the legacy-equipment and the new-equipment, and signals received at the terminals in communication with the legacy-equipment and the new-equipment may be combined and transmitted via the common terminal. As will also be understood, signals may also be transmitted from the legacy-equipment to the new-equipment (and vice versa) via the associated terminals.

The signal destined for the new-equipment is transmitted through a power over coax (POC) filter 230 and then to the new-equipment interface 235 for providing connected new-equipment with a signal conforming to the new standard. The POC filter 230 filters out Alternating Current (AC) power that is being carried over coax that may be used to power the legacy converter 120 and components thereof. In one aspect, the POC filter 230 is a splitter with a low-pass filter with a cutoff below 1 kHz. Higher frequency signals are transmitted to the new-equipment interface 235, while lower frequency signals carrying power are fed to the power supply 240. In various aspects, power is provided from the wired network 130 over coax, which may be provided via a power inserter plugged into an electrical outlet. In other aspects, power may alternatively be provided from the service provider 110 over coax, in which case the POC filter 230 is provisioned between the service provider interface 205 and the POE filter 210 or between the POE filter 210 and the splitter 220.

In various aspects, the POC filter 230 feeds AC power to the power supply 240. The power supply 240 provides the voltages required to operate active circuitry, which may be used, for example, for frequency shifting, Quadrature Phase Shift Keying (QPSK) or amplification of signals transmitted through the legacy converter 120. Each of the splitter 220, down-converter 270, band filter 250, and crossover filter 260 may optionally be powered via the power supply 240. In some aspects, the power supply 240 includes an AC/DC converter. In additional examples, the power supply 240 includes a transformer to adjust the voltage of power to be provided to active components. In examples where power is not received via the POC filter 230, the power supply 240 may include a port for connecting to an alternative power source, including, but not limited to: batteries, solar cells, wall outlets, etc.

The signal destined for the legacy-equipment is transmitted through a band filter 250. The band filter 250 in some aspects is a low-band reject filter, having characteristics to reject frequencies used by some legacy STBs that conflict with downstream communications to/from new-equipment. For example, a low-band reject filter set to reject frequencies from the MoCA D-low band (e.g., 1125 to 1225 MHz) would allow legacy-equipment (e.g., STBs) to be isolated from new-equipment using the same frequencies (e.g., cable modems using DOCSIS version 3.1 with a 1.2 GHz downstream band). Isolating the legacy-equipment from potentially interfering signals enables the service provider 110 to use the latest signal format, while preserving the legacy-equipment's ability to operate within its existing spectrum in an environment that sees concurrent use of new and legacy-equipment.

The signal destined for the legacy-equipment is transmitted through a crossover filter 260. The crossover filter 260 has characteristics to protect legacy-equipment from interference in the "crossover" region (i.e., the frequencies both accepted by legacy-equipment and newly enabled for use by new-equipment). For example, DOCSIS version 3.1, as proposed, may newly use an 85 MHz or 200 MHz return (i.e., for upstream communication from the wired network 130 to the service provider 110) that was not used by DOCSIS version 3.0, which may interfere with legacy-equipment that was interoperable with devices compliant with DOCSIS version 3.0. Continuing the example, the crossover filter 260 may have the characteristics of a 54-85 MHz band-reject filter or a 54-200 MHz band reject filter for dealing with 85 MHz or 200 MHz returns respectively.

The signal destined for the legacy-equipment may be optionally transmitted through an STB out-of-band (OOB) down-converter 270. Legacy-equipment may be limited in the frequencies in which it can receive messages. For example, some STBs can only reliably receive frequencies up to 104 MHz for an OOB carrier signal. The service provider 110, however, to accommodate the latest transmission standards, may transmit signals destined for new-equipment that use the frequency band previously used for messages by the legacy-equipment. The service provider 110, therefore, may shift the frequency band in the signal that the message destined for the legacy-equipment is carried at. For example, legacy STBs may be operable to receive OOB carrier signals from 54-104 MHz, but the OOB carrier may be moved to a higher frequency to enable new-equipment to use some or all of the frequencies previously allocated for OOB carrier signals. A down-converter 270 is therefore provided in some examples to move signals from the frequency bands assigned under a new standard to the frequency bands assigned under an old standard, enabling legacy-equipment to receive signals in expected frequency ranges.

As one of skill in the art will understand, example down-converters 270 receive messages at one frequency and retransmit that message at a lower frequency. Accordingly, to reduce the potential for interference, the down-converters 270 may apply various filters (e.g., high-pass filters, a band-pass filters, etc.) prior to moving the message to ensure that the frequency bands that the messages are shifted are cleared of potential interference.

One of skill in the art will recognize that the order in which the signal destined for the legacy-equipment passes through the band filter 250, crossover filter 260, and optional down-converter 270 may be rearranged from that shown in FIG. 2. One of skill in the art will also recognize that various filter characteristics may be adjusted from the examples given above to shift signals to different frequencies and block other potentially interfering signals. Additionally, one of skill in the art will recognize that different electrical components may be combined to perform the functions of the above discussed filters and converters. For example, a band-pass filter may be a single device, a combination of a low-pass filter and a high-pass filter, or a combination of resistors, inductors, and capacitors (RLC) operable to affect a band-pass filtering.

The legacy converter 120 may optionally include a selector 255 (e.g., switches, dials, etc.) accessible outside of its casing operable to modify the characteristics of internal components for a given install base (e.g., the user devices 160 associated with a given wired network 130). For example, a selector 255 may modify the performance characteristics of internal components (e.g., by tuning pass/reject bands) to match the needs of a given install base. In one example, internal components (e.g., band filter 250, crossover filter 260, and down-converter 270) that include variable resistors, variable capacitors, and variable inductors may be modified by one or more selectors 255 to set filter characteristics to exclude potentially interfering signals. In another example, the selector 255 may comprise a switch operable to include/exclude components from a circuit. Example selectors 255 may enable affected components to be enabled or disabled, filter over a selectable range of frequencies, or switch between a first setting and a second setting to affect a first filtering range or a second filtering range respectively. Although selector 255 is illustrated as optionally affecting band filter 250, crossover filter 260, and down-converter 270, one of skill in the art will recognize that each internal component may be modified by a dedicated selector 255 and that not all internal components need be modifiable by a selector 255 for some internal components to be modifiable by a selector 255.

Figure 3:
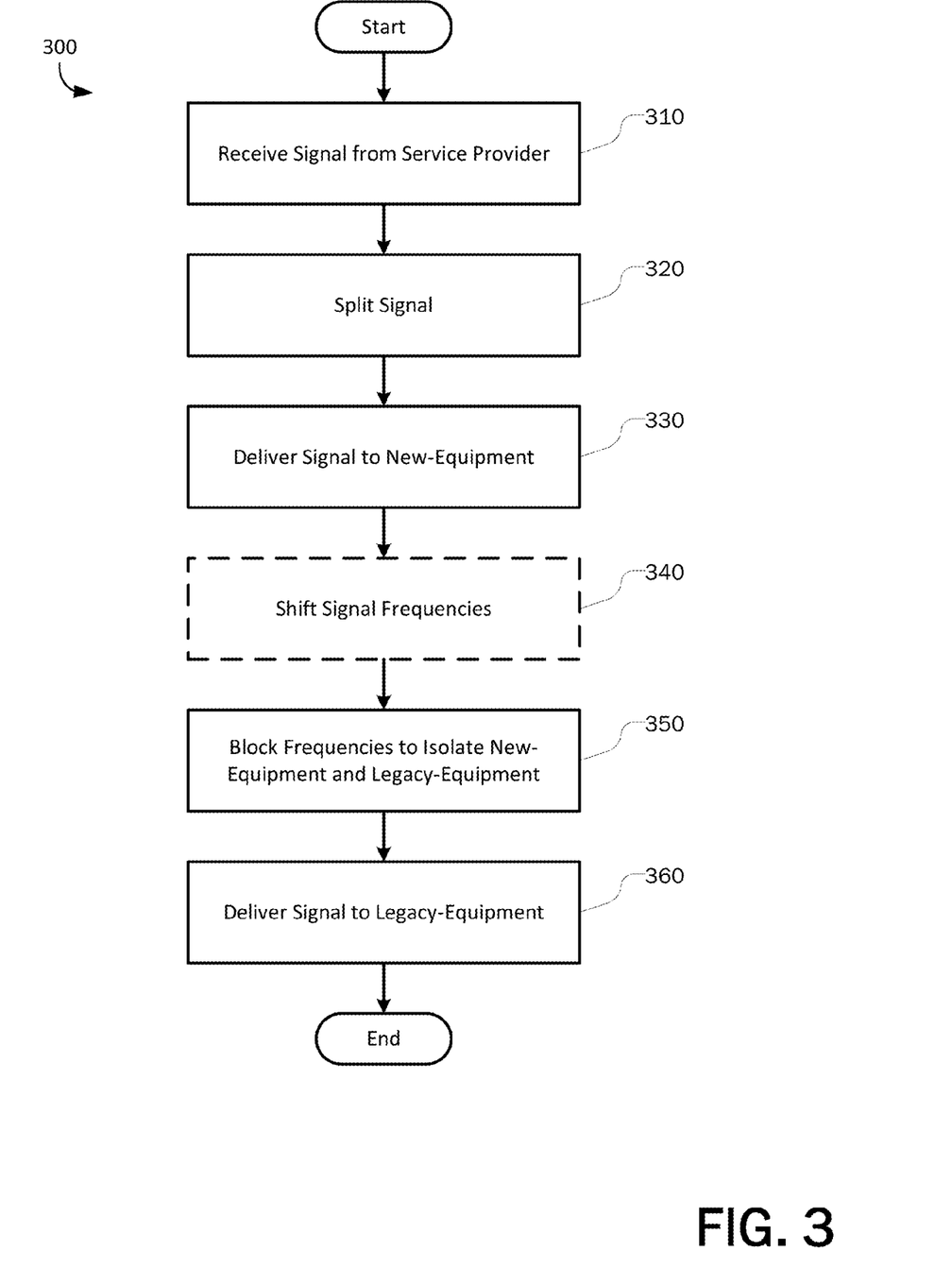
FIG. 3 is a flow chart showing general stages of an example method for enabling the use of legacy-equipment in higher return band splits in relation to downstream communications.

FIG. 3 is a flow chart showing general stages of an example method 300 for enabling the use of legacy-equipment in higher return band splits in relation to downstream communications. Method 300 begins when a signal from a service provider 110 is received at OPERATION 310. According to an example, the service provider 110 has modified its transmission facilities so that the signal conforms with a set of standards including a new standard, which conflicts with at least one standard used by legacy-equipment connected to the same wired network 130 as the new-equipment. Accordingly, the signal received at OPERATION 310 is designed for reception by new-equipment, and legacy-equipment may transmit messages that interfere with this signal or view this signal as interference.

Method 300 therefore proceeds to OPERATION 320, where the signal is split into a first split signal, destined for new-equipment, and a second split signal, destined for legacy-equipment. In some aspects, splitting the signal may also involve amplifying one or more of the split signals. Splitting the signal may be accomplished via an RF splitter. In various aspects, the RF splitter may be have characteristics to split signals having frequencies up to 1.7 GHz.

Method 300 then proceeds to OPERATION 330, where the first split signal is transmitted to the new-equipment. Because the new-equipment and the first split signal conform to the same set of standards, any additional manipulation or interpretation of the signal may be handled by the new-equipment.

If the signal generated by the service provider 110 includes portions destined for the legacy-equipment that the legacy-equipment expects to receive in a different frequency band, method 300 proceeds to OPTIONAL OPERATION 340, where those portions of the signal are shifted to appear in the expected frequency bands. As one of skill in the art will recognize, portions of the signal may be isolated (e.g., with a band-pass filter) and shifted to a higher or a lower frequency. These shifted portions are referred to herein as heterodynes of the original portions. The portion of the signal having frequencies that the heterodynes will occupy may be cleared, for example, by applying a band-reject for those frequencies, to remove potential interference before shifting the heterodynes to occupy the given frequency band in the second split signal. In one aspect, the heterodynes are down-conversions (e.g., frequency shifts to a lower frequency) of the original portions of the signal.

At OPERATION 350 frequency bands are blocked to ensure isolation of the legacy-equipment from the new-equipment. Because the new-equipment and the legacy-equipment operate according to conflicting standards, each set of equipment may compete to use a given frequency band for its signals, thus generating interference for the other set of equipment or the service provider 110. Frequency bands may also be blocked to isolate portions of signals generated by a service provider 110 that are destined for one set of equipment from the other set of equipment. In one aspect, frequencies corresponding to the 1.2 GHz downstream band from a service provider 110 destined for cable modems 140 may be blocked to isolate legacy STBs 150 from those frequencies, which may be already in use to communicate between STBs 150 via the MoCA D-low band (i.e., 1.1 to 1.2 GHz). In another aspect, the frequencies of signals generated by new cable modems 140 that correspond to frequencies that the legacy STBs 150 are capable of receiving may be blocked. For example, a new cable modem 140 complying with DOCSIS version 3.1 that generates upstream signals within an 85 MHz band split may interfere with a legacy STB 150 capable of receiving signals between 54 and 200 MHz, and therefore portions of signals between 54 and 85 MHz may be blocked on the signal destined for the STB 150. In another example, if the new cable modem 140 generates upstream signals within a 200 MHz band split, frequencies between 54 and 200 MHz may be blocked. As one of skill in the art will recognize, several different filters may be appropriate to block a given frequency or set of frequencies, including, but not limited to: low-pass filters, high-pass filters, band-pass filters, band-reject filters, and combinations thereof (e.g., comb filters).

The second split signal is then transmitted to the legacy-equipment at OPERATION 360. Because the second split signal (in the ranges that the legacy-equipment are operable to receive and transmit on) now conforms to the same set of standards that the legacy-equipment operate in, any additional manipulation interpretation of the signal may be handled by the legacy-equipment. Method 300 then concludes.

Figure 4:
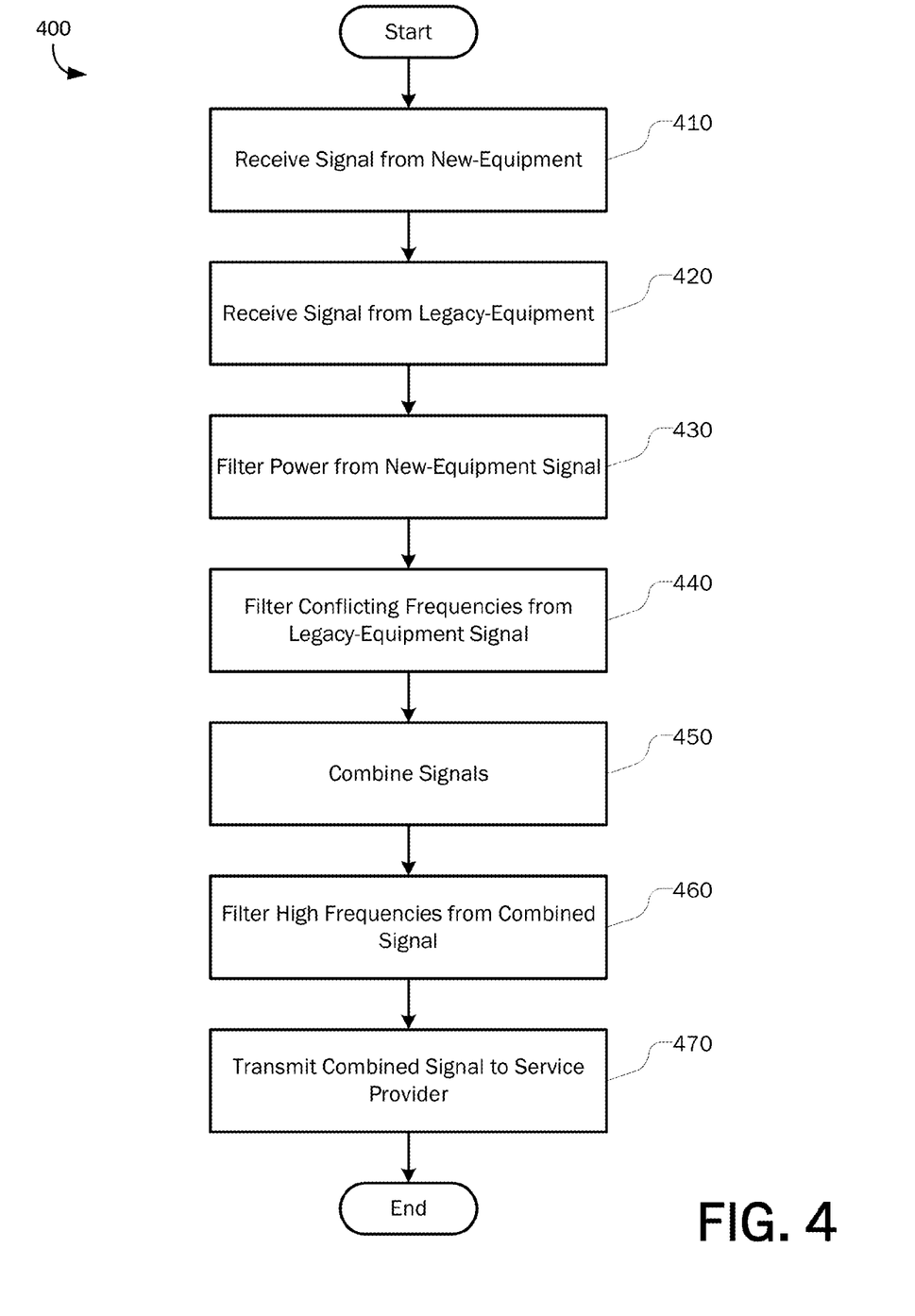
FIG. 4 is a flow chart showing general stages of an example method for enabling the use of legacy-equipment in higher return band splits in relation to upstream communications.

FIG. 4 is a flow chart showing general stages of an example method 400 for enabling the use of legacy-equipment in higher return band splits in relation to upstream communications. Method 400 begins at OPERATION 410 when a signal is received from new-equipment. Signals from new-equipment may be destined for a service provider 110 or to other equipment on the wired network 130. At OPERATION 420, a signal from legacy-equipment is received, which may also be destined for the service provider 110 or to other equipment on the wired network 130. In various examples, signals from new-equipment destined for the service provider 110 may be formatted according to a latest version of the DOCSIS standard, and signals from legacy-equipment may comply with an older version of the DOCSIS standard, but are in conflict with the latest version.

At OPERATION 430 signals generated by the new-equipment are filtered to draw power from the upstream signal to power an active device used to enable the use of legacy-equipment in conjunction with the new-equipment. In one example, a two-way splitter with a filter having characteristics to separate RF frequency signals from lower frequency signals carrying AC power is used to draw power inserted into the signal's transmission medium (e.g., coax) from that transmission medium. According to various aspects, power drawn from the transmission medium may have its voltage transformed (e.g., raised or lowered by a transformer) and/or be converted from AC to DC.

At OPERATION 440 the signals received from legacy-equipment are filtered to remove frequencies that would conflict or interfere with the signals generated by the new-equipment. For example, new-equipment may generate upstream communications destined for the service provider 110 in the frequency band of 54-200 MHz, which would conflict with OOB QPSK carriers in the frequency band of 54-104 MHz used by legacy-equipment to communicate with each other. Therefore, the OOB QPSK carriers are filtered from the legacy-equipment's signals to prevent them from interfering with the upstream communications when the signals are combined.

The signal from the new-equipment and the signal from the legacy-equipment are combined at OPERATION 450. In various aspects, each signal enters a port of a splitter/combiner and a combined signal exits through common port of the splitter/combiner.

The combined signal is filtered at OPERATION 460 to prevent any signals destined for equipment on the wired network 130 from being transmitted to a service provider 110. In various aspects, a low-pass filter is used to prevent high frequency signals from being transmitted to the service provider 110. For example, a 1.2 GHz low-pass filter may allow downstream signals up to 1.2 GHz to enter the wired network 130, but prevent the D-high band of MoCA (i.e., 1.3 to 1.5 GHz) from being transmitted to the service provider 110.

The combined signal is then transmitted to the service provider 110 at OPERATION 470, and method 400 concludes.

Examples and aspects are described above with reference to block diagrams or operational illustrations of methods, systems, and devices. The functions/acts noted in the blocks may occur out of the order as shown in any flowchart or described herein with reference to FIGS. 3 and 4. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated. For example, the functionality of a band-pass filter may be implemented via a single component, a matched low-pass filter and high-pass filter, or a plurality of RLC components in the appropriate arrangement and values known to those of skill in the art.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

I claim:

1. A device for enabling concurrent use of new-equipment and legacy-equipment on a wired network, comprising:
   a service provider interface, operable to receive downstream signals from a service provider and to transmit upstream signals to the service provider;
   a legacy-equipment interface, operable to receive upstream signals from the legacy-equipment and transmit downstream signals to the legacy-equipment;
   a new-equipment interface, operable to receive upstream signals from the new-equipment and transmit downstream signals to the new-equipment;
   a splitter, having terminals to transmit and receive signals, including a common terminal, a first terminal, and a second terminal, the splitter being operable to split signals received at one of the terminals for transmission via other terminals and to combine signals received at two of the terminals for transmission via a remaining terminal, wherein the second terminal is in communication with the new-equipment interface;
   a crossover filter, in communication with the first terminal and the legacy-equipment interface, the crossover filter having characteristics to prevent selected portions of signals generated by the new-equipment from being received by the legacy-equipment;
   a band filter, in communication with the first terminal and the legacy-equipment interface, the band filter having characteristics to prevent selected portions of signals transmitted from the first terminal from being received by the legacy-equipment; and
   a point of entry (POE) filter, in communication with the service provider interface and the common terminal, the POE filter having characteristics to prevent selected portions of signals transmitted between the new-equipment and the legacy-equipment from being transmitted to the service provider.

2. The device of claim 1, further comprising:
   a power over coax (POC) filter in communication with the new-equipment interface and the second terminal, having characteristics to filter power signals from signals generated by the new-equipment; and
   a power supply in communication with the POC filter, the power supply having characteristics to transform power signals to an appropriate voltage, convert transformed power signals from alternating current to direct current, and provide direct current power signals to the device.

3. The device of claim 2, wherein the converted power signal is used to amplify at least one of:
   signals generated by the new-equipment;
   signals generated by the service provider; and
   signals generated by the legacy-equipment.

4. The device of claim 1, further comprising:
   a down-converter in communication with the band filter and the first terminal, the down-converter having characteristics to frequency shift selected portions of signals generated by the service provider to produce heterodynes, wherein the legacy-equipment is not operable to receive those portions of signals generated by the service provider but is operable to receive the heterodynes.

5. The device of claim 1, wherein the device is operable to replace an entry splitter for a home installation.

6. The device of claim 1, further comprising:
   a selector in communication with the crossover filter, having characteristics to enable selection of a first setting for the device and a second setting for the device;

wherein the first setting enables the crossover filter to prevent selected portions of signals generated by the new-equipment from being received by the legacy-equipment according to a first frequency range; and wherein the second setting enables the crossover filter to prevent selected portions of signals generated by the new-equipment from being received by the legacy-equipment according to a second frequency range.

7. The device of claim 6, wherein the selector is further in communication with a down-converter in communication with the band filter and the first terminal, the down-converter having characteristics to frequency shift portions of signals generated by the service provider to produce heterodynes, wherein the legacy-equipment is not operable to receive those portions of the signal generated by the service provider but is operable to receive the heterodynes;

wherein the first setting disables the down-converter; and
wherein the second setting enables the down-converter.

8. A method for enabling concurrent use of new-equipment and legacy-equipment on a wired network, comprising:

receiving a downstream signal from a service provider formatted according to a new standard, wherein the new standard conflicts with a legacy standard;

splitting the downstream signal from the service provider into a legacy-equipment-destined signal and a new-equipment-destined signal;

delivering the new-equipment-destined signal to the new-equipment;

filtering selected frequencies from the legacy-equipment-destined signal such that the legacy-equipment-destined signal complies with the legacy standard;

delivering the legacy-equipment-destined signal to the legacy-equipment;

receiving an upstream signal transmitted from the new-equipment formatted according to the new standard;

receiving an upstream signal transmitted from the legacy-equipment formatted according to the legacy standard;

filtering selected frequencies from the upstream signal transmitted from the legacy-equipment such that the filtered upstream signal transmitted from the legacy-equipment complies with the new standard;

combining the filtered upstream signal transmitted from the legacy-equipment and the upstream signal transmitted from the new-equipment into a combined signal; and transmitting the combined signal to the service provider.

9. The method of claim 8, further comprising filtering the combined signal via a low-pass filter to prevent frequencies higher than 1.2 GHz from being transmitted to the service provider.

10. The method of claim 8, further comprising filtering the upstream signal from the new-equipment to draw power from the upstream signal from the new-equipment.

11. The method of claim 8, wherein downstream signals from the service provider include a message destined for the legacy-equipment carried at frequencies higher than the legacy-equipment can receive, further comprising:

shifting the message to a lower frequency that the legacy-equipment is operable to receive.

12. The method of claim 8, further comprising:

selecting a first setting or a second setting by which the selected frequencies from the legacy-equipment-destined signal are filtered;

wherein the first setting blocks frequencies between 54 MHz and 85 MHz; and wherein the second setting blocks frequencies between 54 MHz and 200 MHz.

13. The method of claim 8, wherein the new standard is version 3.1 of Data-Over-Cable Service Interface Specifications (DOCSIS) and the legacy standards are version 2.0 of Multimedia over Coax Alliance (MoCA) standard and version 3.0 of DOCSIS.

14. The method of claim 8, wherein the method is performed at an entry point for a building containing the wired network.

15. An article of manufacture for enabling concurrent use of new-equipment and legacy-equipment on a wired network, comprising:

a service provider interface, to receive signals from a service provider and transmit signals to the service provider;

a legacy-equipment interface, to receive signals generated by the legacy-equipment and transmit signals to the legacy-equipment;

a new-equipment interface, to receive signals generated by the new-equipment and transmit signals to the new-equipment;

a point of entry (POE) filter in communication with the service provider interface, having characteristics to block signals transmitted between the new-equipment and the legacy-equipment on the wired network from transmission to the service provider;

a splitter having a common terminal in communication with the POE filter, a first terminal, and a second terminal, the splitter having characteristics to split signals received at the common terminal for transmission via each of the first terminal and the second terminal, the splitter having further characteristics to combine signals received at the first terminal with signals received at the second terminal for transmission to the service provider via the common terminal;

a down-converter in communication with the first terminal of the splitter, having characteristics to receive portions of signals destined for the legacy-equipment to create heterodynes of the portions of signals destined for the legacy-equipment;

a band filter in communication with the down-converter, having characteristics to filter selected frequencies from signals generated by the legacy-equipment that conflict with signals generated by the new-equipment;

a crossover filter in communication with the band filter and the legacy-equipment interface, having characteristics to filter selected frequencies from signals destined for the legacy-equipment;

a power over coax (POC) filter in communication with the second terminal of the splitter and the new-equipment interface, having characteristics to filter power from signals generated by the new-equipment; and a power supply in communication with the POC filter and the down-converter, having characteristics to condition power filtered from signals generated by the new-equipment to provide the down-converter with power.

16. The article of manufacture of claim 15, further including a selector operable to change between a first setting and a second setting;

wherein the first setting modifies the crossover filter to have characteristics to block frequencies between 54 MHz and 85 MHz; and wherein the second setting modifies the crossover filter to have characteristics to block frequencies between 54 MHz and 200 MHz.

17. The article of manufacture of claim 16, wherein the first setting further disables the down-converter, and wherein the second setting enables the down-converter.

18. The article of manufacture of claim 15, wherein the down-converter has characteristics to block frequencies between 54 MHz and 105 MHz;
   wherein portions of signals destined for the legacy-equipment have frequencies greater than 105 MHz; and
   wherein heterodynes have frequencies between 54 MHz and 105 MHz.

19. The article of manufacture of claim 15, wherein the band filter is a band-reject filter having characteristics to block frequencies between 1.1 and 1.2 GHz.

20. The article of manufacture of claim 15, wherein the POE filter is a low-pass filter having characteristics to block signals of frequencies greater than 1.2 GHz.

* * * * *